United States Patent [19]
Thompson

[11] 3,721,322
[45] March 20, 1973

[54] SELF-COMPENSATING DISC BRAKE APPARATUS

[76] Inventor: Tom H. Thompson, 2800 North Atlantic Avenue, Daytona Beach, Fla. 32018

[22] Filed: May 17, 1971

[21] Appl. No.: 144,176

[52] U.S. Cl. ............................ 188/196 P, 188/71.8
[51] Int. Cl. ............................................ F16d 65/54
[58] Field of Search..... 188/71.7, 71.8, 196 F, 196 R, 188/196 P, 79.5 GE, 79.5 GT, 79.5 M, 79.5 P; 192/111 A

[56] References Cited

UNITED STATES PATENTS

| | | |
|---|---|---|
| 2,888,109 | 5/1959 | Tankersley..................... 188/196 P |
| 3,285,370 | 11/1960 | Swift................................ 188/196 R |
| 3,439,781 | 4/1969 | Ostwald ........................... 188/196 P |

*Primary Examiner*—Duane A. Reger
*Attorney*—Barnard, McGlynn & Reising

[57] ABSTRACT

Brake apparatus including a housing, a brake shoe mounted on the housing, the brake shoe being movable from a brake relieved position to a brake applying position for applying braking pressure, and means engageable by the brake shoe upon movement of the brake shoe in the direction of the brake applying position operable to return the brake shoe to a brake relieved position in which the braking surface of the brake shoe has a fixed location with respect to the brake applying position regardless of brake wear and previous elastic distortion of the housing.

26 Claims, 8 Drawing Figures

PATENTED MAR 20 1973

INVENTOR.
Tom H. Thompson
BY
Barnes, McGlynn & Reising
ATTORNEYS

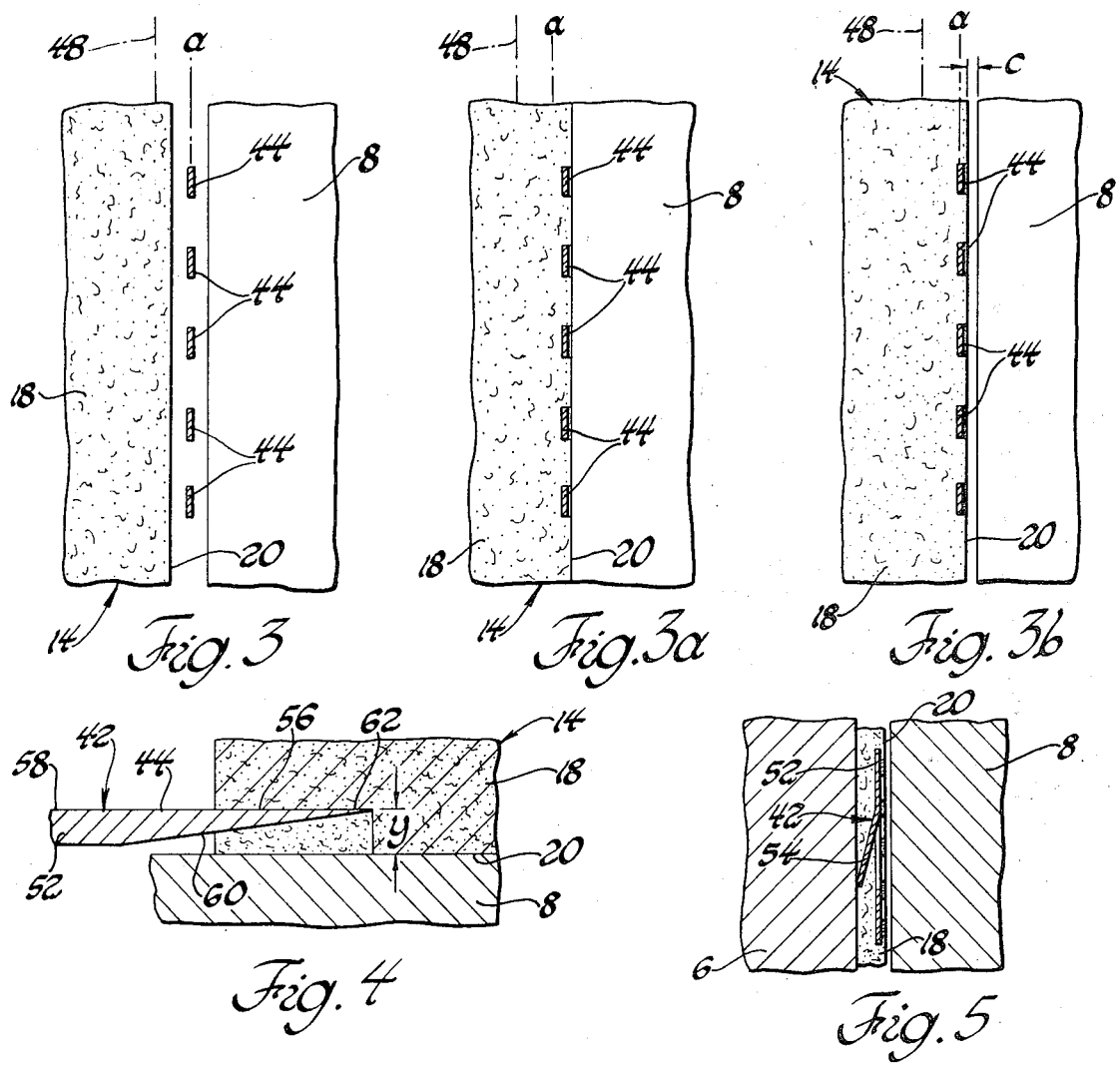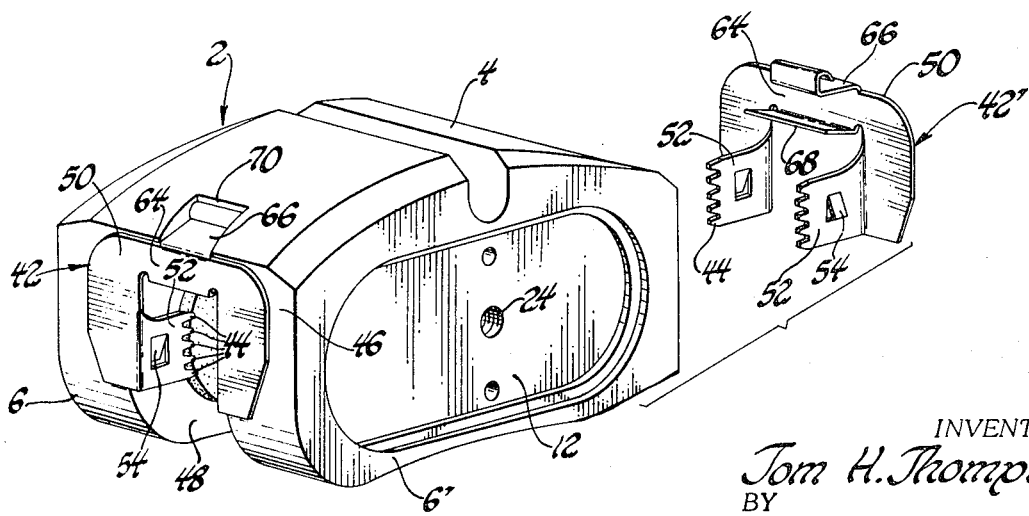

SELF-COMPENSATING DISC BRAKE APPARATUS

This invention relates generally to brake apparatus and is particularly concerned with vehicle disc brake apparatus wherein the braking surface of the brake shoe is always returned to a fixed location with respect to the surface of the disc when the brake force is removed regardless of brake wear and previous elastic distortion of the brake housing.

In vehicle brake apparatus, it is highly desirable, but extremely difficult, to maintain a fixed clearance in the brake relieved position between the surfaces of a brake shoe and the moving member to be engaged by the brake shoe in the brake applying position of the brake shoe. It is extremely difficult to maintain such a fixed clearance because the brake lining material of the brake shoe is constantly subject to wear, and because the housing for the brake shoe or other supporting structure for the brake shoe is frequently subjected to elastic distortion during braking.

For example, in disc brake apparatus utilizing U-shaped caliper housings having leg portions extending from a base portion on each side of a rotating brake disc, the legs of the caliper housing are frequently elastically deflected by the braking pressure resulting in overtravel of at least one of the brake shoes with respect to its associated caliper leg portion. Moreover, the constant reduction in thickness of the brake lining material due to wear would increase the clearance between the braking surface of the brake shoe and the disc in the brake relieved position of the brake shoe if the mechanism for returning the brake shoe to the brake relieved position is not self-adjusting.

The prior art includes many proposed arrangements for automatically returning the brake shoes to a position wherein the braking surface of the brake shoe has a fixed location with respect to the brake disc in the brake off or brake relieved position. These include the type wherein a return spring slips to a new position when the brake shoe moves beyond a predetermined amount so that when the lining wears a predetermined amount, the return spring will compensate for the wear by shifting to a new position so that the running clearance between the braking surfaces, or the clearance in the brake relieved position between the braking surfaces, will not increase because of the brake wear. However, in addition to the inherent difficulties in maintaining the proper frictional mounting for such springs due to the effects of temperature changes, shock, corrosion, and other variable factors encountered during the operating life of the vehicle or the brake system, this approach does not take into account the possibility of overtravel of the brake shoe due to elastic distortion of the brake shoe housing.

There have been many approaches to compensating for both brake lining wear and elastic distortion of the housing. However, these devices have generally included elaborate constructions dependent generally upon maintaining a constant coefficient of friction, permitting a desired amount of slippage between parts when brake lining wear and elastic distortion of the supporting parts causes overtravel of the brake shoe during a braking operation. These systems also generally rely upon a return spring for retracting the brake shoe after a braking operation, the return spring generally being caused to shift its position due to the overcoming of the frictional engagement between two parts when the brake shoe travels beyond a certain amount with respect to the housing. As pointed out above, it is inherently expensive and difficult to attempt to maintain a constant coefficient of friction between two or more parts, and the large number of parts and close tolerances required in prior art devices of this type further increases the expense. None of the prior art apparatus of the type discussed above provides a positive return of the brake shoe to a position in which the braking surface of the brake shoe is located a fixed distance from its brake applying position, or its position in which it engages the brake disc. Examples of prior art patents concerned with this problem are U.S. Pat. No. Re. 26,106; and U.S. Pat. Nos. 2,801,712; 2,905,277; 2,996,886; 3.032,144; 3,285,370; and 2,541,032.

It is therefore an object of this invention to provide a brake apparatus wherein the brake shoe is positively returned from a brake applying position to a brake relieved position, and in which the braking surface of the brake shoe has a fixed location with respect to the brake applying position regardless of brake wear and previous elastic distortion of the brake shoe housing or other supporting structure.

A further object is to provide brake apparatus including a housing having a brake shoe mounted thereon for movement between brake relieved and brake applying positions with return means independent of the brake force applying means, and having a fixed unstressed position with respect to the brake disc, and which unstressed position is independent of any elastic distortion of the housing, the return means engaging the brake shoe and returning the brake shoe to a position wherein the braking surface of the brake shoe has a fixed location with respect to the brake applying position of the brake shoe regardless of brake wear and any previous elastic distortion of the housing.

A further object is to provide apparatus for positively returning a brake shoe to a brake relieved position wherein the exact clearance desired is maintained between the surface of the brake shoe and the brake disc or other member to be engaged by the brake shoe that is independent of the mechanism for actuating the brake shoe in a brake applying direction.

Still another object is to provide apparatus for positively returning a brake shoe to a brake relieved position from a brake applying position in which the return apparatus is not subject to the elastic distortion of the housing and which is independent of the mechanism for applying braking pressure to the brake shoe and automatically adjusts the position of the braking surface of the brake shoe to maintain the exact clearance regardless of wear in the brake relieved position of the brake shoe.

In carrying out the foregoing, and other objects, brake apparatus according to the present invention includes a housing with a brake shoe mounted on the housing for movement from a brake relieved position to a brake applying position for applying braking pressure. A return spring member is mounted on the housing and has a prong projecting into the path of movement of the brake shoe in the brake applying direction. The prong is operable in response to braking pressure to penetrate the brake lining material of the brake shoe to a fixed depth relative to the braking surface of the brake lining material and subsequently return the brake shoe to a brake relieved position when the braking pressure is removed. The prong of the spring member has a fixed unstressed position with respect to the housing so that it always returns to the same position and always penetrates the brake lining material to a fixed depth with respect to the braking surface. Consequently, the braking surface of the brake shoe is always returned to the same location with respect to the housing, and with respect to the brake disc, regardless of brake wear, and regardless of any elastic distortion of the housing during the braking operation.

Other objects, advantages and features of the invention will become apparent from the following description taken in connection with the accompanying drawings in which:

FIGS. 3, 3a and 3b are detailed views illustrating positions of various components of the brake apparatus in different conditions of operation;

FIG. 4 is an enlarged sectional detailed view taken on lines 4—4 of FIG. 2;

FIG. 5 is an enlarged, sectional detailed view taken on lines 5—5 of FIG. 2; and FIG. 6 is a perspective view, partially exploded, of the apparatus of FIG. 1.

Figure 1:
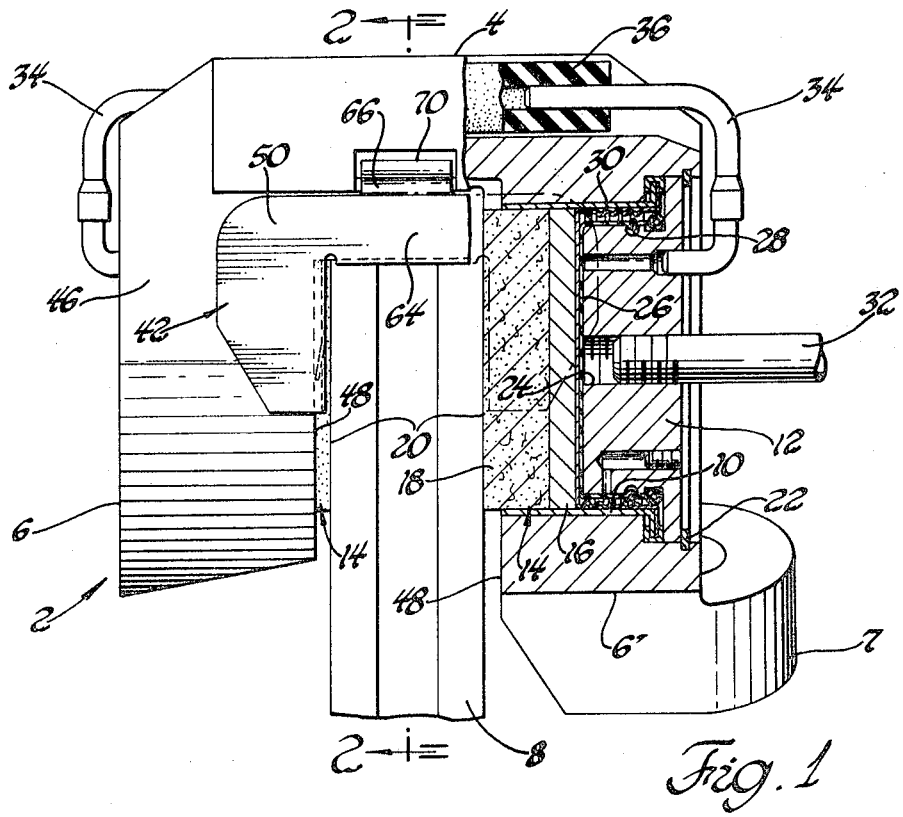
FIG. 1 is an elevational view, partially in section, of disc brake apparatus embodying the present invention.
Figure 2:
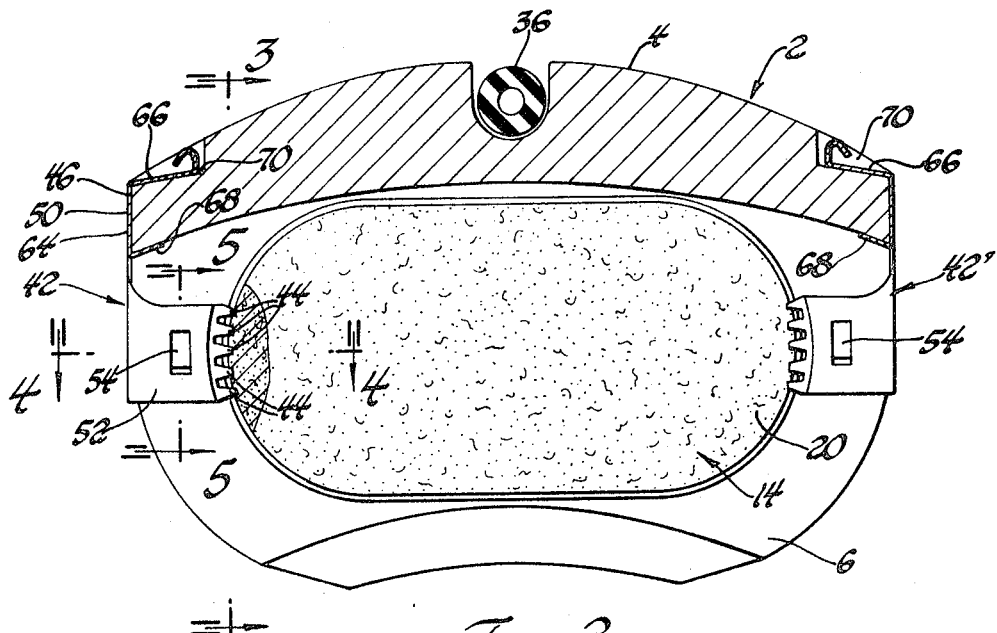
FIG. 2 is a sectional view taken on lines 2—2 of FIG. 1.

With reference primarily to FIGS. 1, 2 and 6, reference numeral 2 collectively designates a caliper housing having a peripheral base portion 4 and a pair of leg portions 6 and 6' extending from the base portion 4 in spaced relationship with each other. The leg portions 6 and 6' extend alongside a wheel mounted rotor or disc 8 which projects into the space between the leg portions 6 and 6'. Extending through the respective leg portions is an opening defining a recess 10, the openings in each leg portion being in coaxial relationship in the illustrated embodiment.

Leg portion 6' in the illustrated embodiment is formed with a mounting lug 7. Otherwise, the construction of leg portions 6 and 6' is identical, and their identical brake components are housed in each of the recesses 10 of the respective leg portions 6 and 6'. Therefore, the description of one of the leg portions 6 and 6' and of the components mounted therein will be applicable to the other.

A cap member 12 is detachably mounted on the housing and defines an end wall for recess 10 by closing the end of the opening extending through the leg portion 6'. A brake shoe designated generally by reference numeral 14 is mounted in each of the recesses 10. Each of the brake shoes 14 includes a metal backing plate 16 and a layer of brake lining material 18 having a friction or braking surface 20 for engagement with the disc 8 to apply braking pressure to the disc 8.

The cap member 12 is detachably mounted in leg portion 6' by a snap ring 22, and an elastic diaphragm 26 is mounted on the cap member 12 and is secured in position by an elastic band 28. A threaded fluid passage 24 is formed in the cap member 12 for admitting hydraulic fluid from a master brake cylinder or other source causing the diaphragm 26 to expand and apply pressure against the end wall of a corrugated actuator 30 secured in position by the cap member 12. When fluid pressure is applied through the passage 24, the actuator 30 extends to urge the brake shoe 14 into engagement with the disc 8 so that the braking surface 20 of the brake shoe 14 applies frictional braking pressure against the disc 8.

In FIG. 1, a conduit 32 connects passage 24 of the cap member 12 in leg portion 6' with the source of fluid pressure, and the cap member 12 of leg portion 6' is in turn connected with the corresponding cap member of leg portion 6 through a conduit including nonflexible members 34 and a flexible member 36. The specific construction of cap member 12, diaphragm 26, actuator 30, or the hydraulic connections between the corresponding elements in leg portions 6 and 6', form no part of the present invention but are shown merely to provide an illustration of one form of hydraulic actuating mechanism for applying braking pressure through the brake shoe 14. The present invention is not limited to the specific brake actuating mechanism and, as will be apparent from the following description, can be used with brake apparatus having any hydraulic, mechanical or other actuating mechanism for causing the brake shoes to apply braking pressure to the disc 8.

Brake apparatus according to the present invention may thus comprise a housing 2 with a brake shoe 14 mounted in the housing, the brake shoe 14 being movable from a brake relieved position (FIG. 3b) to a brake applying position (FIG. 3a) for applying braking pressure; and means engageable by brake shoe 14 upon movement of the brake shoe 14 in the direction of the brake applying position operable to return the brake shoe to a brake relieved position in which the braking surface 20 of the brake shoe 14 has a fixed location with respect to the brake applying position regardless of brake wear and any previous elastic distortion of the housing 2.

The means referred to in the last paragraph comprises a return spring member 42 having at least one prong 44 projecting into the path of movement of the brake shoe 14 in the brake applying direction from the brake relieved position, the prong 24 being operable in response to braking pressure to penetrate the brake lining material 18 of the brake shoe 14 to a fixed depth relative to the braking surface 20 thereof and return the brake shoe 14 to a brake relieved position when the braking pressure is removed.

The housing 2 includes an end wall 46, and a side wall 48 defining the inner side surface of the leg portions 6 and 6' extends generally transversely of the direction of movement of the brake shoe 14. Spring member 42 has a body portion 50 overlying the end wall 46, and a positioning arm 52 extends from the body 50 along the side wall 48, the prongs 44 being formed on the free end of the positioning arm 52. The positioning arm 52 is maintained in spaced relationship with the side wall 48 by an abutment 54 in the form of a tab staked from the positioning arm 52. As shown in FIG. 4, each of the prongs 44 is wedge-shaped in cross-section with the inner surface 56 thereof adjacent the brake shoe 14 being flat and continuous with the corresponding inner surface 58 of the positioning arm 52, and the opposite surface 60 being inclined from the free end of the prong so that the free end of the prong has a sharp point as indicated at 62 in FIG. 4.

The spring member 42 may be formed of sheet spring steel and may be secured to the housing 2 by spring clip means integrally formed on the spring member 42. The flat body portion 50 of the spring member 42 includes a bight portion 64 overlying the end wall of the base portion of the housing 2, and the spring clip means comprises a pair of spring arms 66 and 68 extending from the bight portion 64. A recess 70 is formed in the outer surface of the base portion 4 for receiving one of the spring arms 66, the other spring arm 68 extending beneath the lower surface of the base portion 4 as shown in FIG. 2. The spring member 42 is attached to the housing 2 by resiliently forcing the spring arms 66 and 68 into the position shown in FIG. 2. The tabs 54 locate the positioning arms 52 with respect to the adjacent side walls 48 of the leg portions 6 and 6' and thus determine the nonstressed location of the prongs 44 with respect to the side walls 48 and hence the side surfaces of the disc 8.

The unstressed position of the prongs 44 is illustrated in FIG. 3. The prongs 44 are maintained in a nonstressed position by the tab 54 reacting against the side wall 48 along an axis $a$ as shown in FIG. 3. When a new brake shoe 14 is installed into the assembly, the parts may have the relative positions shown in FIG. 3 before the brakes are applied. When braking pressure is applied to the brake shoe 14 to move it toward the right in FIG. 3 so that the braking surface 20 engages the disc 8, the braking surface 20 first engages the side 56 of the prongs 44. As the braking surface 20 engages the prongs 44, the small area of the prongs 44 in engagement with the braking surface 20 results in high concentrated pressure between the prongs 44 and the brake lining material 18. As a result, the prongs 44 penetrate the brake lining material 18, as illustrated in FIG. 4, as the brake shoe moves into braking engagement with the disc 8 as shown in FIG. 3a. In FIG. 3a, the braking surface 20 of the brake shoe 14 is in braking engagement with the disc 8 and the prongs 44 have been resiliently forced to the right of axis $a$ but have penetrated the material of the brake lining 18 such that the surface 60 is out of contact with the disc 8.

When the braking pressure is subsequently removed from the brake shoe 14, the prongs 44 resiliently force the brake shoe 14 to return to a brake relieved position as shown in FIG. 3b in which the braking surface 20 is located a distance $c$ from the disc 8. The distance $c$ between the braking surface 20 and the disc 8 in the brake relieved position shown in FIG. 3b is always the same regardless of any wear on the brake lining material 18 for the reason that the prongs 44 always have a fixed unstressed position with respect to the side wall 48 and disc 8, and always penetrate the brake lining material to the same depth with respect to the braking surface 20. For example, as shown in FIG. 4, the prong 44 always penetrates the brake lining material 18 when braking pressure is applied to a distance $y$ with respect to the braking surface 20. As the brake surface wears, and the braking surface 20 approaches the backing plate 16, the position of the prongs 44 with respect to the backing plate 16 decreases while remaining constant with respect to the braking surface 20.

In the illustrated embodiment, the apparatus includes a pair of spring members 42 and 42' which are identical to each other and which are mounted on opposite ends of the base portion 4 of the housing 2. Thus, the drawings illustrate a brake apparatus comprising a caliper housing 2 having a peripheral base portion 4 and a pair of spaced leg portions 6 and 6' extending therefrom with a rotatable brake disc 8 received between the leg portions 6 and 6'. A pair of brake shoes 14 is mounted on the housing 2 adjacent each leg portion 6 and 6' for movement between a brake relieved position illustrated in FIG. 3b in which the respective braking surfaces 20 of each brake shoe 14 is spaced from the adjacent surface of the disc 8, and a brake applying position illustrated in FIG. 3a in which the respective braking surfaces of each brake shoe 14 is engaged with the adjacent surface of the disc 8 to apply braking pressure thereto; brake force applying means 28, 30, 32 for actuating the brake shoes 14 from their respective brake relieved positions to their respective brake applying positions; and means 42, 44 engageable by the brake shoes 14 as they move in the brake applying direction operable to return the brake shoes 14 to the brake relieved position of FIG. 3b in which the braking surface 20 is located a fixed distance $c$ from the adjacent surface of the disc 8 regardless of brake wear or any previous elastic distortion of the housing.

In the drawings, the housing 2 is fixed with respect to the disc 8, and the brake shoes 14 are each movable relative to the respective leg portions 6 and 6' between the brake relieved and brake applying positions. The means engageable by the brake shoes as they move in the brake applying direction comprises the pair of spring members 42 and 42' each mounted on opposite ends of the housing 2 and each having a pair of positioning arms 52. Each of the positioning arms 52 extends along the surface 48 of opposite leg portions 6 and 6' adjacent the associated brake shoes 14, and include a plurality of prongs 44 on each of the positioning arms projecting into the path of movement of the associated brake shoe 14 in the brake applying direction from the brake relieved position. As stated above, the prongs are operable in response to braking pressure to penetrate the brake lining material of the associated brake shoe 14 to a fixed depth $y$ (as shown in FIG. 4) relative to the braking surface 20 thereof and return the associated brake shoe 14 to a brake relieved position of FIG. 3b when the braking pressure is removed. Each of the spring members has a body portion 50 overlying the respective end walls of the housing 2, the positioning arms 52 each extending from the body portion 50 in spaced relationship with each other. A tab 54 is staked from each positioning arm that projects into engagement with the associated leg portion to maintain the positioning arms in spaced relationship with the respective leg portions 48 and determine the unstressed position of the prongs 44.

During braking, the leg portions 6 and 6' tend to deflect elastically such that the space between the leg portions 6 and 6' increases. This may be pronounced under extreme breaking pressures. As a result, when the brake shoes 14 are engaged with the disc 8, the braking surfaces 20 are spaced from the respective sidewalls a distance equal to the distance $c$ of FIG. 3b plus the amount of deflection of the respective leg portion from their normal positions. However, when the brake pressure is relieved, and the deflection of leg portions 6 and 6' thus removed, the braking surface 20 is still returned to the brake relieved position of FIG. 3b since the return spring 42 is not affected by the elastic distortion or deflection of the leg portion.

While the disclosed apparatus is suitable primarily for disc brake applications, the invention may be also embodied in any apparatus for retarding movement or rotation between a pair of relative rotatable members. Thus, the drawings illustrate a pair of relatively rotatable members 2 and 8 with a friction shoe 14 mounted on one of the members 2 having a friction face 20. The friction shoe 14 is movable from a disengaged position (FIG. 3b) spaced from the other of said members 8 so as not to interfere with relative rotation between the members 2 and 8 to an engaged position as shown in FIG. 3a in which the friction face is frictionally engaged with the other member 8 to retard relative rotation between the members 2 and 8. Means 44 is engageable by the friction shoe 8 upon movement of the friction shoe 14 in the direction of the engaged position operable to return the friction shoe 14 to the disengaged position in which the friction face 20 of the friction shoe 14 has a fixed location c with respect to the engaged position regardless of wear and previous elastic distortion of the members 2 and 8.

While specific embodiments of the invention have been disclosed in the accompanying drawings and described in the foregoing specification, it should be understood that the invention is not limited to the exact construction shown. Alterations in the construction and arrangements of parts, all falling within the scope and spirit of the invention, will be apparent to those skilled in the art.

I claim:

1. Brake apparatus comprising: a housing; a brake shoe mounted on said housing, said brake shoe being movable from a brake relieved position to a brake applying position for applying braking pressure; and means engageable by said brake shoe upon movement of said brake shoe in the direction of said brake applying position operable to return said brake shoe to a brake relieved position in which the braking surface of said brake shoe has a fixed location with respect to said brake applying position regardless of brake wear and previous elastic distortion of said housing, said means comprising a return spring member having at least one prong projecting into the path of movement of said brake shoe in the brake applying direction from said brake relieved position, and operable in response to braking pressure to penetrate the brake lining material of said brake shoe to a fixed depth relative to the braking surface thereof and return the brake shoe to a brake relieved position when the braking pressure is removed.

2. Apparatus as claimed in claim 1 wherein said housing comprises an end wall and a side wall extending from said end wall extending generally transversely of the direction of movement of said brake shoe; said spring member having a body overlying said end wall and a positioning arm extending from said body along said side wall, said prong being formed on said positioning arm.

3. Apparatus as claimed in claim 2 including an abutment between said side wall and positioning arm for maintaining said positioning arm in spaced relationship with said side wall.

4. Apparatus as claimed in claim 3 wherein said abutment comprises a tab staked from said positioning arm.

5. Apparatus as claimed in claim 4 wherein said prong is wedge-shaped in cross-section with the inner surface thereof adjacent said brake shoe being flat and continuous with the corresponding inner surface of said positioning arm, and the opposite surface being inclined from the free end of said prong.

6. Apparatus as claimed in claim 1 wherein said prong is wedge-shaped in cross-section with the inner surface thereof adjacent said brake shoe being flat and continuous with the corresponding inner surface of said positioning arm, and the opposite surface being inclined from the free end of said prong.

7. Apparatus as claimed in claim 5 wherein said housing comprises a base portion with a leg portion extending therefrom, said side wall being defined on said leg portion, and further including spring clip means securing said spring member to said base portion.

8. Apparatus as claimed in claim 7 wherein the body of said spring member includes a bight portion overlying the end wall of the base portion of said housing, and said spring clip means comprises a pair of spring arms extending from said bight portion.

9. Apparatus as claimed in claim 8 wherein a recess is formed in the outer surface of said base portion for receiving one of said spring arms.

10. Brake apparatus comprising: a caliper housing; said housing having a base portion and a leg portion extending therefrom, said leg portion having an inner side wall, and a spring member mounted on said housing and having a brake shoe positioning arm extending along said inner side wall operable to position the braking surface of a brake shoe adapted to be movably mounted on said housing in a fixed position with respect to said housing in a brake relieved condition regardless of brake wear; said base and leg portions of said housing having end walls, and said spring member including a body overlying said end walls, said positioning arm extending from said body; an abutment between said side wall and positioning arm for maintaining said positioning arm in spaced relationship with said side wall, said abutment comprising a tab staked from said positioning arm, at least one prong extending from the free end of said positioning arm, said prong being wedge-shaped in cross-section with the inner surface thereof adjacent said side wall being coplanar and coextensive with the corresponding inner surface of said positioning arm, and the opposite surface being inclined with respect to the corresponding surface of said positioning arm to form a sharp edge at the free end of said prong.

11. Apparatus as claimed in claim 10 further including spring clip means formed on said spring member and securing said spring member to said housing.

12. Apparatus as claimed in claim 11 wherein the body of said spring member has a bight portion overlying the end wall of said base portion, and said spring clip means comprises a pair of spaced spring arms extending from said bight portion.

13. Apparatus as claimed in claim 12 wherein a recess is formed in the outer surface of said base portion for receiving one of said spring arms.

14. Brake apparatus comprising: a housing having a base portion adapted to overly the peripheral edge of a rotating brake disc, and a leg portion extending from said base portion and having a side wall adapted to extend alongside such disc; a brake shoe mounted on said housing for movement in a brake applying direction generally transverse to said side wall from a brake relieved position; brake shoe positioning means engageable by said brake shoe as it moves from the brake relieved position in the brake applying direction operable to return said brake shoe to a brake relieved position in which the braking surface thereof has a fixed location with respect to said side wall regardless of wear and previous elastic distortion of said housing, said brake shoe positioning means comprising a spring member mounted on said housing having a positioning arm engaging said brake shoe at a position which is fixed with respect to the braking surface of said brake shoe regardless of brake wear, and which is variable with respect to the surface of said brake shoe opposite the braking surface in accordance with brake wear; and at least one prong projecting from said positioning arm into the path of movement of said brake shoe in the brake applying direction and operable in response to braking pressure to penetrate the brake lining material of said brake shoe to a fixed depth relative to the braking surface thereof and return the brake shoe to a brake relieved position.

15. Apparatus as claimed in claim 14 including an abutment between said side wall and positioning arm for maintaining said positioning arm in spaced relationship with said side wall.

16. Apparatus as claimed in claim 15 wherein said abutment comprises a tab staked from said positioning arm.

17. Apparatus as claimed in claim 16 wherein said prong is wedge-shaped in cross-section with the inner surface thereof adjacent said side wall being coplanar and coextensive with the corresponding inner surface of said positioning arm, and the opposite surface being inclined with respect to the corresponding surface of said positioning arm to form a sharp edge at the free end of said prong.

18. Apparatus as claimed in claim 14 wherein said prong is wedge-shaped in cross-section with the inner surface thereof adjacent said side wall being coplanar and coextensive with the corresponding inner surface of said positioning arm, and the opposite surface being inclined with respect to the corresponding surface of said positioning arm to form a sharp edge at the free end of said prong.

19. Apparatus as claimed in claim 17 further including spring clip means formed on said spring member and securing said spring member to said housing.

20. Brake apparatus comprising: a caliper housing having a peripheral base portion and a pair of spaced leg portions extending therefrom; a rotatable brake disc received between said leg portions, a pair of brake shoes mounted on said housing adjacent each leg portion for movement between a brake relieved position in which the respective braking surfaces of each brake shoe is spaced from the adjacent surface of said disc, and a brake applying position in which the respective braking surfaces of each brake shoe is engaged with the adjacent surface of said disc to apply braking pressure thereto; brake force applying means for actuating said brake shoes form their respective brake relieved positions to their respective brake applying positions; means engageable by at least one of said brake shoes as it moves in the brake applying direction operable to return at least said one brake shoe to a brake relieved position in which the braking surface of said one brake shoe is located a fixed distance from the adjacent surface of said disc regardless of brake wear and previous elastic distortion of said housing, said housing being fixed with respect to said disc, and said brake shoes each being movable relative to the respective leg portions of said housing between the brake relieved and brake applying positions, said means comprising a pair of spring members each mounted on opposite ends of said housing and each having a pair of positioning arms; each of said positioning arms extending along the surface of opposite leg portions adjacent the associated brake shoes; and at least one prong on each of said positioning arms projecting into the path of movement of the associated brake shoe in the brake applying direction from the brake relieved position, said prong being operable in response to braking pressure to penetrate the brake lining material of the associated brake shoe to a fixed depth relative to the braking surface thereof and return the associated brake shoe to the brake relieved position when the braking means is removed.

21. Apparatus as claimed in claim 20 wherein each of said spring members has a body portion overlying the respective end walls of said housing, said positioning arms extending from said body portion.

22. Apparatus as claimed in claim 1 including a tab staked from each positioning arm and projecting into engagement with the associated leg portion to maintain the positioning arm in spaced relationship with the leg portion.

23. Apparatus for retarding rotation between a pair of relatively rotatable members comprising: a friction shoe mounted in one of said members having a friction face, said friction shoe being movable from a disengaged position spaced from the other of said members so as not to interfere with relative rotation between the members to an engaged position frictionally engaged with said other member to retard relative rotation between the members; and means engageable by said friction shoe upon movement of said friction shoe in the direction of said engaged position operable to return said friction shoe to a disengaged position in which the friction face of said friction shoe has a fixed location with respect to said engaged position regardless of wear and previous elastic distortion of said members, said means comprising a spring member mounted on said one relatively rotatable member, said spring member having at least one prong projecting into the path of movement of said friction shoe in the engaged direction from the disengaged direction and operable in response to engaging pressure penetrate said friction shoe to a fixed depth relative to the friction surface thereof and return the friction shoe to a disengaged position when the engaging pressure is removed.

24. Brake shoe positioning apparatus comprising: a spring member having a body portion with at least one resilient positioning arm extending therefrom, and at least one prong on said positioning arm operable to engage and penetrate brake lining material in response to braking pressure.

25. Apparatus as claimed in claim 24 wherein said spring member is of sheet material and said body extends at an angle from said positioning arm.

26. Apparatus as claimed in claim 25 including spring clip means mounted on said body portion for securing said spring member to a brake housing.

* * * * *